(12) United States Patent
Floury et al.

(10) Patent No.: US 11,411,909 B2
(45) Date of Patent: Aug. 9, 2022

(54) DEVICE AND METHOD FOR PROCESSING A MESSAGE

(71) Applicant: Orange, Paris (FR)

(72) Inventors: Cédric Floury, Chatillon (FR); Aurore Catteau, Chatillon (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 16/912,438

(22) Filed: Jun. 25, 2020

(65) Prior Publication Data

US 2020/0412678 A1 Dec. 31, 2020

(30) Foreign Application Priority Data

Jun. 25, 2019 (FR) ...................................... 1906913

(51) Int. Cl.
*H04L 51/42* (2022.01)
*G06F 40/30* (2020.01)
*G06F 40/274* (2020.01)
*H04L 51/00* (2022.01)

(52) U.S. Cl.
CPC ............ *H04L 51/22* (2013.01); *G06F 40/274* (2020.01); *G06F 40/30* (2020.01); *H04L 51/16* (2013.01)

(58) Field of Classification Search
CPC ......... H04L 51/22; H04L 51/16; H04L 51/02; G06F 40/30; G06F 40/274; H04M 3/53366; H04M 3/42382; H04M 2203/559; G06Q 10/107
See application file for complete search history.

(56) References Cited

U.S. PATENT DOCUMENTS

| 9,860,200 | B1 | 1/2018 | Braun et al. |
| 10,332,123 | B2* | 6/2019 | Alexander .............. G06F 9/453 |
| 2012/0303614 | A1* | 11/2012 | Mercuri ............... G06Q 10/101 |
| | | | 707/723 |
| 2014/0330890 | A1* | 11/2014 | Hourani .................. H04W 4/21 |
| | | | 709/203 |

(Continued)

FOREIGN PATENT DOCUMENTS

WO WO 2018/125340 A1 7/2018

OTHER PUBLICATIONS

Elsa Negre, "Comparaison de textes: quelques approaches . . . ", Oct. 17, 2013, https://hal.archives-ouvertes.fr/hal-00874280.

(Continued)

*Primary Examiner* — Austin J Moreau
(74) *Attorney, Agent, or Firm* — Knobbe, Martens, Olson & Bear, LLP

(57) ABSTRACT

A message treatment process executed by a user's terminal when a message is being drafted is disclosed. The terminal has access to a corpus of messages containing at least one message sent by that user to at least one recipient user. In one aspect, at least one part of the message drafted by the user is retrieved. Concerning at least one message in the corpus, a semantic similarity score is calculated with a view to match at least part of the draft message with one message at least in the predetermined corpus of messages. At least one message is selected in the corpus of messages, based on the semantic similarity score calculated for a least one message in the corpus, then at least part of a previously received reply to at least one selected message is replicated.

20 Claims, 3 Drawing Sheets

(56) References Cited

U.S. PATENT DOCUMENTS

| | | | |
|---|---|---|---|
| 2015/0347900 A1* | 12/2015 | Bell | G06N 5/02 |
| | | | 706/11 |
| 2015/0356573 A1* | 12/2015 | Zadrozny | G06Q 30/0201 |
| | | | 705/7.32 |
| 2019/0007350 A1 | 1/2019 | Koukoumidis et al. | |
| 2020/0090197 A1* | 3/2020 | Rodriguez | G06N 3/0454 |

OTHER PUBLICATIONS

Notification of a Preliminary Research Report for Application No. FR1906913, the priority counterpart, dated Apr. 16, 2020.

* cited by examiner

DEVICE AND METHOD FOR PROCESSING A MESSAGE

CROSS-REFERENCE TO RELATED APPLICATIONS

This application claims the benefit of foreign priority to French Patent Application No. 1906913, filed Jun. 25, 2019, the contents of which is incorporated by reference herein in its entirety.

TECHNOLOGICAL FIELD

The disclosure concerns communication between terminals and more particularly the identification of redundant information sent during communication.

DESCRIPTION OF RELATED TECHNOLOGY

Nowadays, a user has many ways at his or her disposal to communicate with a conversational partner. For instance, two users can exchange information or communicate by text messaging, using either an SMS (Short Message Service) application, or through an instant conversation application (such as WhatsApp, etc.) or by voice messages, using for example a voice dictation and MMS (Multimedia Message Service) sending application, or via a voice message service or even a video conference service (Skype, Facetime, etc.).

Contacts between users are multiplying and it is frequent for the same information to be exchanged between two users during the course of different contacts. A typical example is that a user asks the same questions to his or her conversational partner, for instance because the user does not remember having already asked that question or because s/he does not know if the answer was saved or where it was saved.

For example, at a given moment in time a user asks a conversational partner by SMS for his or her address. A few months later, the same user sends another SMS, again requesting the address of the conversational partner because s/he did not save it in his or her contacts, or because s/he forgot already asking for that postal address. The conversational partner must then retype his or her address in response to the SMS. This can be tedious and represents a loss of time as much for the user as for the conversational partner.

SUMMARY OF CERTAIN INVENTIVE ASPECTS

This disclosure brings improvement to the existing state of the art. Its aim is to provide a message treatment process executed by a user's terminal, when the user is drafting a message. The terminal has access to a corpus of messages including at least one message sent by the user to at least one recipient user. The process of this disclosure comprises the following steps:
  obtaining at least one part of the message being drafted by the user,
  calculating, for at least one message of the corpus of messages, a semantic similarity score, matching the at least one part of the message being drafted with the at least one message of the corpus of messages,
  selecting from the corpus of messages of at least one message, based on the semantic similarity score expected for the at least one message of the corpus,
  replicating at least one part of at least one message received as a reply to the at least one selected message.

The disclosure thus facilitates the identification in a corpus of messages sent by a user to a recipient user, of at least one message similar to the message being drafted by the user. The reply previously received in response to the identified message is then replicated for the user drafting the message about to be sent to the recipient user, or to any other recipient user, as it is highly probable that the contents will match the reply expected by the user drafting the message.

For example, if the user drafts a message requesting his or her postal address to the recipient user and if a message containing the reply to such question was previously received by the user, the message treatment process in this disclosure allows for the identification and for the delivery to the user of the replicate reply. The user can then choose to abandon drafting the message. The process under the disclosure prevents from sending redundant messages via a communication network (a similar question and a similar reply sent at different times) and is a timesaver for the two conversational partners.

According to one embodiment, the corpus of messages forms a history of the messages sent or received by the user of the terminal.

According to one embodiment, a message similar to the one being drafted by the user is searched for in the communication history. In this way, the search scope is not limited to the messages exchanged between the user drafting a message and the recipient user. Indeed, the reply to the message being drafted may already have been received by the user of the terminal from a user different to the recipient user.

According to one embodiment, the message being drafted is in text or voice form. In the case of a voice message, a phase of transcription of the message may be added to convert into text the words dictated by the user.

According to one embodiment, the corpus of messages can include messages sent or received via different applications. According to this specific embodiment, the process involves searching for messages with a similar semantic score to that of the message being drafted, amongst messages sent or received by the user of the terminal, via the different means of communication used by him or her to have contact with a conversational user, for example SMS, instant conversation application, voice message service, electronic mail etc.

It is indeed possible that the user has previously sent a message similar to the message being drafted but via an application different to the one used to send the message being drafted.

According to one embodiment, at least one message is selected from the corpus of messages when the semantic similarity score of the message is higher than a predetermined threshold.

For example, according to this specific embodiment, the selected messages have a semantic similarity score of at least an 80% match with the message being drafted.

According to one embodiment, when several messages in the corpus reach a semantic similarity score higher than the predetermined threshold, the message selected from the corpus is the one with the highest semantic similarity score.

According to this specific embodiment, only the most relevant message is selected, and the reply previously received in response to that message is delivered to the user.

According to one embodiment, the replication of at least one part of at least one previous reply includes displaying the at least one part of that previous reply on a graphic interface of the communication application used by the user drafting a message; the at least one part of that previous reply being displayed in a banner above the window used by the user to draft his or her message.

According to this specific embodiment, the possible reply to the message being drafted is readily visible for the user of the terminal.

According to another embodiment, if all the semantic similarity scores of the messages in the corpus fall below the predetermined score, no message from that corpus is selected. According to this specific embodiment, if there is no message with sufficient similarity, no reply is replicated for the user. For instance, it could be a draft message being written for the first time by the user.

The disclosure also concerns a message treatment device for messages being drafted, the communication device comprising a memory storage and a processor configured to:
- access a corpus of messages including at least one message sent by the user to at least one recipient user,
- obtain at least one part of the message being drafted by the user,
- calculate, for at least one message of the corpus of messages, a semantic similarity score matching the at least one part of the message being drafted with the at least one message of the corpus of messages,
- select from the corpus of messages at least one message based on the semantic similarity score calculated for the at least one message of the corpus,
- replicate at least one part of at least one message previously received as a reply to the at least one selected message.

According to another embodiment, the terminal includes a message treatment device as described above.

The disclosure also concerns a computer program with instructions for executing the message treatment process as detailed above, using any of the embodiments precedingly mentioned whenever the program is executed by a processor. This process may be run in various ways, including in cable form or as software.

This program can use any programming language, and whether expressed as source code, as object code, or as intermediary code between source and object codes, as in a partially compiled form, or in any other appropriate form.

This disclosure also includes a recording medium and a data carrier readable by a computer and inclusive of instructions related to computer programming as mentioned above.

The recording medium mentioned above can be any entity or device capable of storing the program. For instance, the medium can have data storage such as ROM, for example a CD-ROM or a ROM microelectronic circuit, or even magnetic recording means, a hard disc, a USB key. Additionally, the recording medium may correspond to a transmissible signal such as an electric or optical signal, that can be routed via an electrical or an optical cable or with the use of a radio or any other means. The programs under this disclosure can be downloaded from an Internet-type network.

Alternatively, the recording medium may correspond to an integrated circuit to which the program is combined, this circuit being adapted to execute or to be used during the execution of the process in question.

BRIEF DESCRIPTION OF THE DRAWINGS

Other aims, features and advantages of the disclosure shall appear more clearly from the following description given by way of a simple illustrative and non-exhaustive example made with reference to the figures of which.

DETAILED DESCRIPTION OF CERTAIN ILLUSTRATIVE EMBODIMENTS

Figure 1:
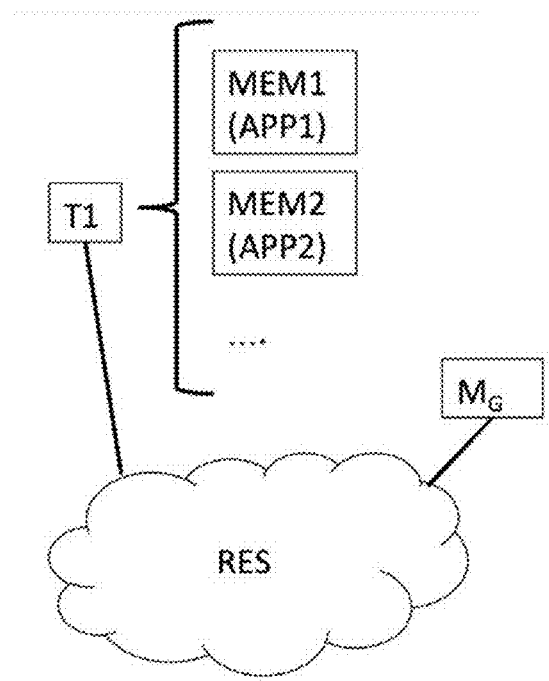
FIG. 1 presents a set up environment for the disclosure according to one embodiment.

FIG. 1 presents a set up environment for the disclosure, according to one embodiment. The environment in question includes a terminal T1, for example a Smartphone or a PC (Personal Computer). Terminal T1 is adapted to send and receive communication to or from other terminals, via a communication network named RES (stands for "réseau" in French, meaning network in English). The RES communication network can be for example a fixed or mobile data network.

The T1 terminal is adapted to access one or several memory locations in which is stored a conversation history between terminal T1 user and other users. For example, and as illustrated in FIG. 1, terminal T1 includes memory locations MEM1 and MEM2, respectively assigned to different communication applications, such as APP1 and APP2, in which are respectively saved the messages exchanged between terminal T1 user and other users. What is meant by "messages exchanged between terminal T1 user and other users" is messages sent or received by terminal T1 user to or from other users.

The aforementioned communication applications may be any type of applications adapted to send and receive text and voice messages. These applications may for instance be: an email box, an instant message application, a voice message service, a voice dictation application, an SMS or an MMS application etc.

Concerning voice messages sent or received by terminal T1 user, these are converted beforehand into text messages and memorised under that format.

The messages exchanged and saved in the memory locations can be the messages exchanged between terminal T1 user and another user; or exchanged between groups of users.

Each user who has either received or sent a previously saved message is identified under an identifier, such as a mobile phone number or an email address.

The message history of terminal T1 user can also be saved on a distant server (marked as "MG" on FIG. 1), for example a server regrouping all messages sent or received by the user via different terminals.

Figure 2:
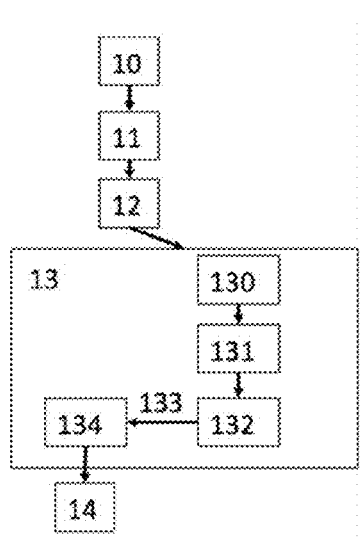
FIG. 2 illustrates steps of a message treatment process according to one embodiment.

FIG. 2 illustrates steps of the message treatment process according to one embodiment.

During step 10, a user U1 using terminal T1 wants to write a message for the attention of another user U2.

To do so, during step 10, s/he selects for example user U2 from a contact list saved in terminal T1. As an alternative, user U1 may select a message from a conversation with user U2 and compose his or her message in response to the selected message. User 1 then starts writing his or her message, either through voice dictation or by typing the text in a composition window.

For example, user U1 sends a message to user U2 containing a question such as "What is your postal address?" or "What is your date of birth?".

According to another example, user U1 sends a message to user U2 containing a question related to another user named U3, such as "What is U3's postal address?" or "What is U3's date of birth?".

During step 11, terminal T1 obtains at least part of the message being drafted. For each word entered, for instance when the last character entered is a "space", the entered word is provided to a semantic analysis module MASS (FIG. 5) which examines the semantic similarities between the words of the message being drafted and words from messages previously sent or received by the user of terminal T1. Additionally, during step 11, terminal T1 extracts from the message being drafted at least one user identifier in relation to that message being drafted. As the case may be, it could be the identifier for user U2 who is the recipient of the message being drafted and/or the identifier of user U3 named in that message. During step 11, terminal T1 sends the identifier/s to the semantic analysis module MASS.

According to one embodiment, when the draft message is a voice message, the words dictated by the user of terminal T1 are transcribed during step 12.

During a step 13, terminal T1 determines the response likely to be expected by user U1 when drafting the message. To do so, the semantic analysis module MASS examines the semantic similarity between the words in the message being drafted and the words in messages in a corpus of messages to which terminal T1 has access to.

By default, the corpus of messages matches the messages exchanged between user U1 and user U2 via the communication application used by user U1 when drafting his or her message.

As an alternative, the corpus of messages used to run the semantic analysis may extend to messages exchanged between user U1 and user U2 via various communication applications.

According to one embodiment, during step 130, terminal T1 determines which corpus of messages will be used to run the semantic analysis. For instance, when terminal T1 gains access to a data network, the semantic analysis module MASS can search for similar messages in user U1's message history saved on a distant server, for example the MG server described in relation to FIG. 1.

When terminal T1 cannot gain access to a data network, or if its connection capacity is limited (low bandwidth for instance), the semantic analysis module MASS can search for similar messages in the memory locations of terminal T1 only.

According to one embodiment, depending on the calculation capacity of terminal T1 and on its network connection capacity, the semantic analysis can be carried out by a distant semantic analysis module.

During step 131, the semantic analysis module MASS calculates a semantic similarity score matching the words entered by user U1 when drafting a message with each message of the previously determined corpus of messages.

The calculation of semantic similarity between texts can be worked out using existing technical state of the art. Examples of semantic similarity analytical methods are found for instance in "Comparaison de textes: quelques approches . . . " by Elsa Negre, 2013, ref: hal-00874280.

These technical methods make it possible to determine the relevance of a message previously sent or received in relation to the message being drafted. In other words, the higher the score of a message, the most likely it is to match the text of the message being drafted.

It consequently becomes possible to determine if a similar message was previously either sent or received by user U1.

During step 132, depending on the semantic similarity score calculated for the messages in the corpus, one or several messages, or no message at all, is selected.

According to one embodiment, the messages with a semantic similarity score higher than a predetermined threshold are selected. For example, messages with a score higher than an 80% match are selected.

According to another embodiment, the message with the highest semantic similarity score is selected, regardless of the threshold.

As an alternative to this specific embodiment, the message with the highest semantic similarity score, and provided the score is higher than the predetermined threshold, is selected.

Consequently, if no message has a semantic similarity score higher than the predetermined threshold, then no message is selected.

During its search, the semantic analysis module can also run in several languages. For example, if user U1 communicates in several distinct languages with the same conversational partner, the semantic analysis module can analyse messages in the corpus of messages in a language different to the message being drafted. The words contained in that message being drafted are then translated into a language used in a message in the corpus, so as to analyse its semantic similarity.

The semantic analysis module also takes into account the time-related nature of the words contained in the message being drafted. For example, if user U1 asks a similar question to which a reply of a time-related nature is expected, in other words, if the answer is likely to vary based on the moment when the question is asked, the semantic analysis module does not look for similar messages. For example, if user U1 on terminal T1 asks a question such as "What time is the appointment?", or "When will you be at home?", or "Which cinema are we meeting?", the semantic analysis module does not look for similar messages.

During step 133, the semantic analysis module MASS sends to terminal T1 a corpus containing a selection of relevant messages. As described above, this corpus of relevant messages may also be empty.

During step 134, terminal T1 selects for at least one message of the corpus of relevant messages, a reply previously received in response to that relevant message.

For example, the selected reply is the one received immediately after sending the relevant message.

During a step 14, terminal T1 replicates at least one part of the selected reply for user U1 composing his or her message. An example of this replication is shown in FIG. 4.

Figure 3:
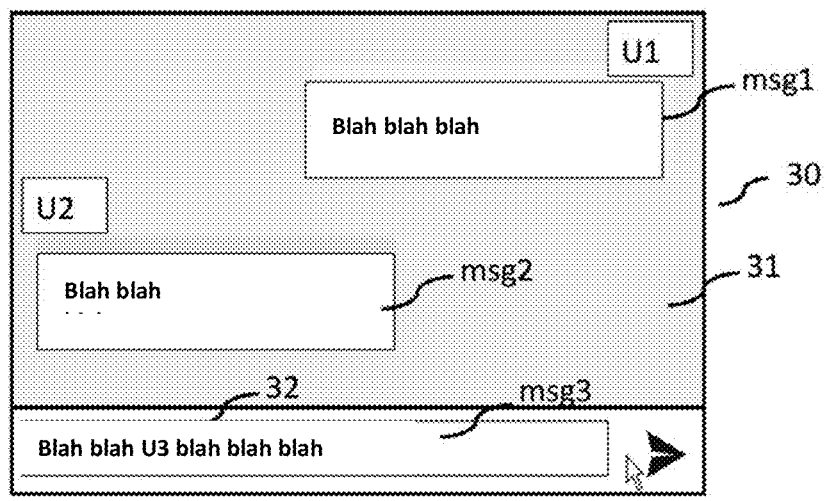
FIG. 3 illustrates a typical graphic interface of a message composition application according to the Prior Art.

FIG. 3 illustrates an example of a graphic interface 30 of a message composition application according to the Prior Art. Graphic interface 30 includes box 31 into which are displayed messages msg1 and msg2 previously exchanged between the user of terminal T1 and the recipient user U2; and also a window 32 into which user U1 of terminal T1 is drafting a message msg3.

Figure 4:
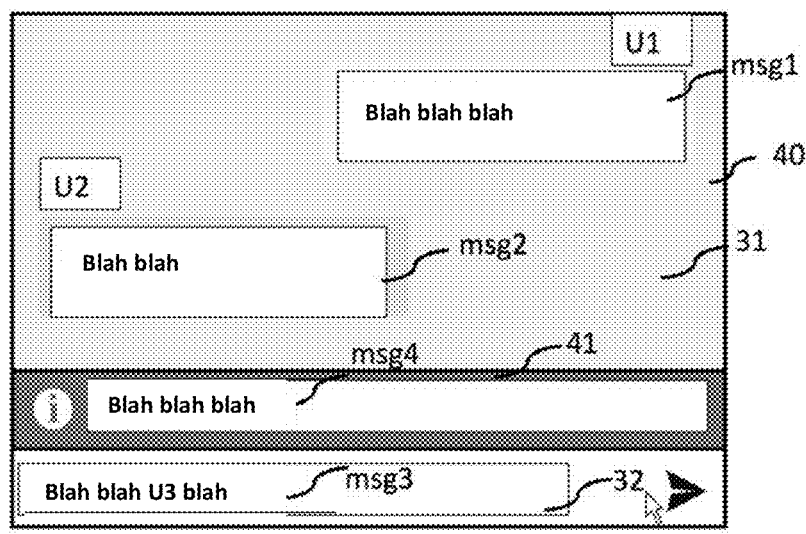
FIG. 4 illustrates a typical graphic interface of a message composition application according to one embodiment.

FIG. 4 illustrates an example of the graphic interface 40 of a message composition application according to one embodiment.

Graphic interface 40 is similar to graphic interface 30 described in relation to FIG. 3. Graphic interface 40 is modified via the execution of the message treatment process described in relation to FIG. 2 according to one embodiment, whenever a reply message selected during step 13 is replicated during step 14.

To achieve this, during step 14, the selected reply, or at least a part of it, is displayed in banner 41 placed above window 32 for composing the message. Information indicating to the user that a similar message was previously sent can also be displayed in banner 41.

For instance, the message being drafted, msg3 could be: "could you please give me your postal address?".

In this example, a similar message was previously sent by user U1 to user U2. In this case, a message msg4 is displayed in banner 41 to user U1, the message msg4 is for example of the type: "It looks like U2 has already replied to this question a month ago with the answer: ": "Bat. WF, 2 avenue Pierre Marzin, 2300 Lannion".

If during step 132, no relevant message is selected, graphic interface 40 is not modified.

Figure 5:
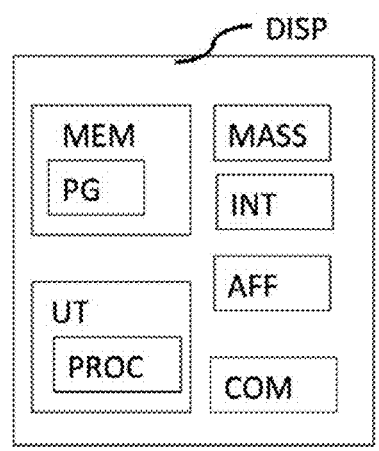
FIG. 5 illustrates an example of a device adapted to set up the message treatment process according to one embodiment.

FIG. 5 illustrates an example of device DISP, which is adapted to execute the message treatment process according to any embodiment precedingly described.

According to one embodiment, the device DISP is designed like a typical computer or mobile phone and specifically includes memory location MEM, a treatment unit UT, equipped for example with a processor PROC, and controlled by a computer program PG stored in memory location MEM. The PG computer program includes instructions for executing the message treatment process described in relation to FIG. 2, whenever the PG program is executed by processor PROC.

When booting, the instructions on the PG computer program code are for instance downloaded in a memory location before being executed by processor PROC.

According to one embodiment, the device DISP includes a module MASS to analyse the semantic similarity between the words of a message being drafted on an interface of device DISP and words from messages saved in MEM memory location or in a distant memory location.

The device DISP also includes a user interface INT allowing the user to draft a message and a screen AFF allowing for the replication of at least one part of a relevant message as a match with the message being drafted.

The device DISP also includes a communication interface COM allowing this device to communicate with other terminals, to access a distant memory location or a distant semantic analysis module MASS.

According to one embodiment, the device DISP is included in a terminal (smartphone, tablet, mobile phone, portable computer, etc. . . . ).

What is claimed is:

1. A method executed by a terminal of a communication network, the method comprising, when the terminal is drafting a message:
    replicating by the terminal, on a user interface of the terminal, at least one part of at least one message received as a reply to at least one first message of a corpus of messages, the at least one message being selected by the terminal from the corpus based on a semantic similarity between at least one part of the message being drafted and the at least one first message in the corpus of messages, wherein the corpus of messages comprises messages exchanged between the user and at least one recipient user using at least one communication application,
    wherein replicating on the user interface of the terminal the at least one part of the at least one reply message includes displaying at least one part of the reply message in a communication application graphic interface used to draft the message being drafted; and
    wherein the displaying of at least one part of the reply message in a communication application graphic interface used to draft the message is an indication that a similar message was previously transmitted.

2. The method according to claim 1, wherein the corpus of messages is a history of sent or received messages by the user of the terminal.

3. The method according to claim 1, wherein the message being drafted comprises voice or text.

4. The method according to claim 1, wherein the corpus of messages includes messages sent or received via different applications.

5. The method according to claim 1, wherein the at least one first message in the corpus of messages is selected based on a semantic similarity score of the first message of the corpus and the at least one part of the message being drafted being higher than a first value.

6. The method according to claim 5, wherein the message with the highest semantic similarity score in the corpus of messages is selected, in response to that several messages from the corpus have a semantic similarity score higher than the first value.

7. The method according to claim 5, wherein no message from the corpus is selected when all the semantic similarity scores for the messages in the corpus are below a second value.

8. A non-transitory computer storage medium comprising program code instructions that, when executed, cause a processor to implement the method according to claim 1.

9. The method of claim 1, wherein the at least one part of the reply message is displayed above a window used to draft the message being drafted.

10. The method of claim 9, wherein the at least one part of the reply message is displayed in a banner located above the window used to draft the message being drafted.

11. A device comprising memory storage and a processor, wherein the memory storage comprises instructions that, when executed, cause the processor to:
    access, when a message is being drafted from a terminal of a communication network, a corpus of messages including messages exchanged between a user of the terminal and at least one recipient user using at least one communication application; and
    replicate, on a user interface of the terminal, at least one part of at least one message previously received as a reply to at least one first message of the corpus of messages, the at least one message being selected by the device from the corpus based on a semantic similarity between at least one part of the message being drafted and the at least one first message in the corpus of messages,
    wherein replicating the at least one part of the at least one reply message includes a display of at least one part of the reply message in a communication application graphic interface used to draft the message being drafted;
    wherein the display of at least one part of the reply message in a communication application graphic interface used to draft the message is an indication that a similar message was previously transmitted.

12. A terminal including the device according to claim 11.

13. The device for processing messages according to claim 11, wherein the corpus of messages includes messages sent or received via different applications.

14. The device for processing messages according to claim 11, wherein the corpus of messages is a history of messages sent or received by the user of the terminal.

15. The device for processing messages according to claim 11, wherein the message being drafted comprises voice or text.

16. The device for processing messages according to claim 11, wherein the at least one part of the reply message is displayed above a window used to draft the message being drafted.

17. The device for processing messages according to claim 11, wherein no message from the corpus is selected when all scores of the semantic similarity for the messages in the corpus are below a value.

18. The device for processing messages according to claim 11, wherein the at least one first message in the corpus of messages is selected based on a semantic similarity score of the first message of the corpus and the at least one part of the message being drafted being higher than a first value.

19. The device for processing messages according to claim 18, wherein the message with the highest semantic similarity score in the corpus of messages is selected, in response to that several messages from the corpus have a semantic similarity score higher than the first value.

20. A method executed by a terminal of a communication network, the method comprising, when a user of the terminal is drafting a message:

replicating, by the terminal, on a user interface of the terminal, at least one part of at least one message received as a reply to at least one first message of a corpus of messages, the at least one message being selected from the corpus based on a semantic similarity between at least one part of the message being drafted and the at least one first message in the corpus of messages, wherein the corpus of messages includes messages exchanged between the user of the terminal and the at least one recipient user using a plurality of communication applications, wherein replicating, by the terminal, on the user interface of the terminal the at least one part of the at least one reply message includes displaying at least one part of the reply message in a communication application graphic interface used to draft the message being drafted, and wherein the displaying of at least one part of the reply message in a communication application graphic interface used to draft the message is an indication that a similar message was previously transmitted.

* * * * *